(12) United States Patent
Spry et al.

(10) Patent No.: US 7,568,216 B2
(45) Date of Patent: Jul. 28, 2009

(54) METHODS FOR DEFINING AND NAMING iSCSI TARGETS USING VOLUME ACCESS AND SECURITY POLICY

(75) Inventors: Andrew J. Spry, Wichita, KS (US);
Kevin Lindgren, Newtown, KS (US);
James Lynn, Rose Hill, KS (US)

(73) Assignee: LSI Logic Corporation, Milpitas, CA (US)

( * ) Notice: Subject to any disclaimer, the term of this patent is extended or adjusted under 35 U.S.C. 154(b) by 717 days.

(21) Appl. No.: 10/741,559

(22) Filed: Dec. 19, 2003

(65) Prior Publication Data

US 2005/0138418 A1    Jun. 23, 2005

(51) Int. Cl.
*H04L 9/00* (2006.01)
(52) U.S. Cl. .......................................... 726/1
(58) Field of Classification Search ................... 726/4
See application file for complete search history.

(56) References Cited

U.S. PATENT DOCUMENTS

| | | | |
|---|---|---|---|
| 6,009,535 A | 12/1999 | Halligan et al. | |
| 6,732,289 B1 | 5/2004 | Talagala et al. | |
| 6,769,071 B1 | 7/2004 | Cheng et al. | |
| 7,055,056 B2 | 5/2006 | Bessire | |
| 2003/0115447 A1* | 6/2003 | Pham et al. | 713/153 |
| 2003/0177174 A1* | 9/2003 | Allen et al. | 709/203 |
| 2003/0229689 A1* | 12/2003 | Raghavan et al. | 709/223 |

2005/0223279 A1    10/2005 Malpani et al.

OTHER PUBLICATIONS

Rob Elliot, Nov. 2, 2002, T10/02-419r0 SAM-3 SPC-3 SAS FCP-3 SRP-2 Device identifiers and VPD data, pp. 1-2.*
Mark Bakke et al., Aug. 2001, iSCSI Naming and Discovery, pp. 2-21.*
Rob Elliott, Email to T10 Technical Comimittee, Nov. 2, 2002, pp. 1-11.*
Julian Satran, Email to Marjorie Kreuger, Jul. 17, 2002, pp. 1-6.*
iSCSI Technical White Paper; www.ietf.org.
iSCSI Review; http://www.digit-life.com/articles2/iscsi/; Nov. 17, 2003.
iSCSI for Storage Networking; www.ietf.org.
iSCSI Building Blocks for IP Storage Networking; SNIA IP Storage Forum.
iSCSI Protocol Concepts and Implementation; Cisco Systems.

* cited by examiner

*Primary Examiner*—Kambiz Zand
*Assistant Examiner*—Harris C Wang
(74) *Attorney, Agent, or Firm*—Suiter Swantz pc llo

(57) ABSTRACT

The present invention is directed to methods for defining and naming iSCSI targets using volume access and security policy. In an exemplary aspect of the present invention, a method for defining an iSCSI target using volume access and security policy may include the following steps. One or more volumes of a network entity may be first mapped to an initiator. The mapping defines the unique Logical Unit Number for the volume to an initiator. Then, a security level may be defined for access to each volume accessed by the initiator. The subset of mappings for each initiator may be given any unique name. Next, the mapping and security subsets may be used to define the fully qualified targets with which the initiator may open a session.

20 Claims, 3 Drawing Sheets

US 7,568,216 B2

METHODS FOR DEFINING AND NAMING ISCSI TARGETS USING VOLUME ACCESS AND SECURITY POLICY

CROSS-REFERENCE TO RELATED DOCUMENTS

The present application herein incorporates the following United States patent applications by reference in their entirety:

| Attorney Docket Number | Express Mail Label Number | Filing Date |
|---|---|---|
| LSI 03-1820 | EV 303 409 755 US | Dec. 19, 2003 |
| LSI 03-1821 | EV 380 206 525 US | Dec. 19, 2003 |

FIELD OF THE INVENTION

This invention relates generally to data storage systems, and particularly to methods for defining and naming iSCSI targets using volume access and security policy.

BACKGROUND OF THE INVENTION

Internet Small Computer System Interface (iSCSI) is an SCSI transport protocol for mapping of block-orientated storage data over TCP/IP (Transmission Control Protocol/Internet Protocol) networks. iSCSI builds on two widely used technologies—SCSI commands for storage and IP protocols for networking. By carrying SCSI commands over IP networks, iSCSI is used to facilitate data transfers over intranets and to manage storage over long distances. The iSCSI protocol enables universal access to storage devices and storage area networks (SANs). These networks may be dedicated networks or may be shared with traditional Ethernet applications.

In order to configure and manage iSCSI targets, conventional approaches often require a great amount of configuration for a given target, distributing the configuration to different objects (such as the iSCSI initiator), defining a least common denominator configuration for multiple initiators accessing a target, allowing a chat between the iSCSI layer and other network layers such as IPsec, and/or prohibiting some types of access. Under such approaches, the use of short CHAP (Challenge Handshake Authentication Protocol) secrets may be simply disallowed or may be allowed only if the implementation iSCSI layer is allowed to chat with the IPsec layer to determine the security policy in effect on the connections in a session.

Thus, it would be desirable to provide a method for simplifying the configuration and management of iSCSI targets.

SUMMARY OF THE INVENTION

Accordingly, the present invention is directed to methods for defining and naming iSCSI targets using volume access and security policy. In an exemplary aspect of the present invention, a method for defining an iSCSI target using volume access and security policy may include the following steps. One or more volumes of a network entity may be first mapped to an initiator. The mapping defines the unique Logical Unit Number for the volume to an initiator.

Then, a security level may be defined for access to each volume accessed by the initiator. The subset of mappings for each initiator may be given any unique name. The unique name does not have to be the initiator name, which in iSCSI terms is quite a large construct and would be difficult to use in the synthesized target name due to length restrictions. Basically, all LUN (logical unit number) mappings accessed by a single initiator form a subset that that may be given a name. However, the LUN mappings associated with each initiator's subset need to have unique Logical Unit Numbers. The named subset may be given a name as simple as mNNN, where the NNN is simply a sequence number, and the like. The name may be assigned by the user or may be automatically assigned. The name is used here for the purpose of building the fully qualified subset by the initiator name. It is understood that an alternative method for building the LUN mapping subsets is to create a target, generate LUN mappings for each volume to be made visible through the target, assign a single security level to the target, then define which initiator (or initiators in a cluster) are allowed access to the target. The target name may have a mapping subset name (e.g., mNNN, and the like) and a security level name portions defined entirely independently of the initiator which assesses the target. Thus, there are two ways to subset access to all volumes on an iSCSI entity.

Next, the mapping and security subsets may be used to define the fully qualified targets with which the initiator may open a session.

In an additional exemplary aspect of the present invention, a method for naming a fully qualified iSCSI target based on volume mapping and security level subsets on a network entity may include the following steps. A fully qualified target is first provided. Then, a name is generated for the fully qualified target using a format including at least one of a security segment and a mapping segment.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
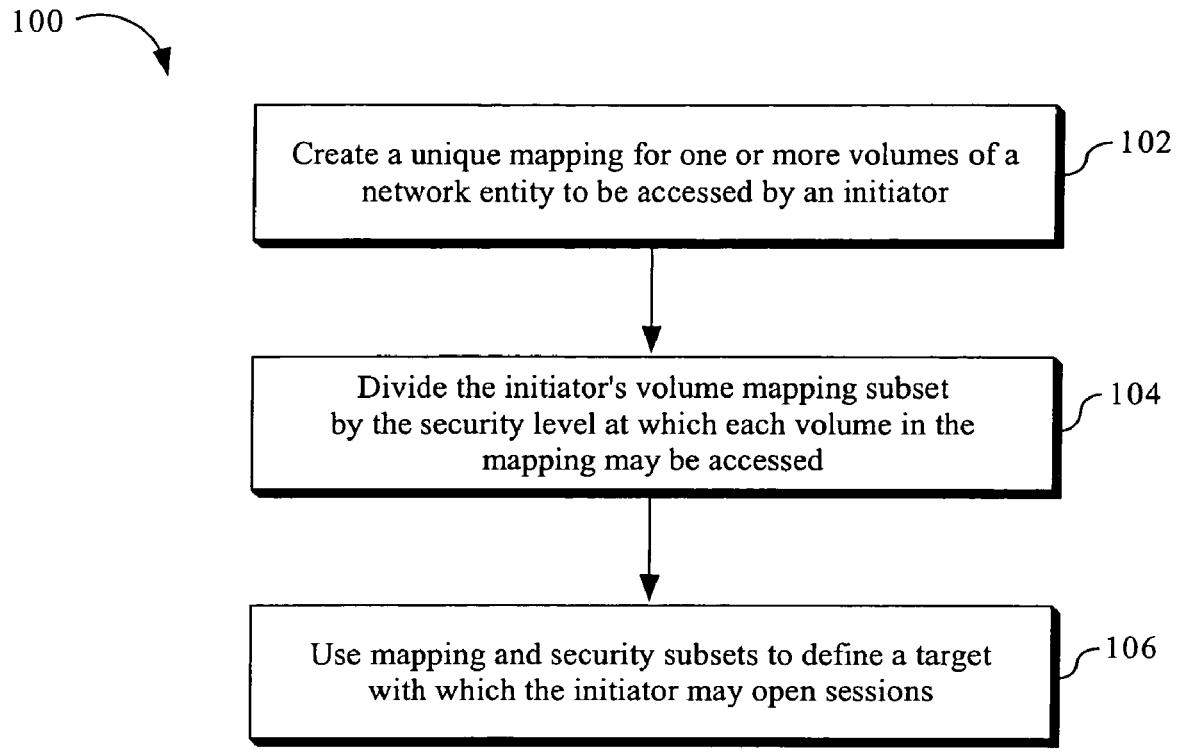
FIG. 1 is a flow chart illustrating an exemplary method for defining iSCSI targets using volume access and security policy in accordance with an exemplary embodiment of the present invention.

Reference will now be made in detail to the presently preferred embodiments of the invention, examples of which are illustrated in the accompanying drawings.

The present invention provides a method by which the iSCSI target may be associated with resources of a shared network entity based on an initiator access control list and IPsec security policy. A naming convention based on these attributes is also provided to allow target names to be synthesized rather than stored.

The present invention provides a method and apparatus to simplify the configuration and management of iSCSI targets by defining specific targets for each initiator/target pair that may form an iSCSI session. Each session is formed between a specific initiator and target pair that is capable of being uniquely specified by only the target name. It is understood that multiple sessions may be formed between the initiator/target pair by the same initiator, but only one initiator can open sessions with a given target. When a target is defined to be accessed by a single initiator, all configuration information may be associated with the target. Alternatively, multiple initiators may access a single target (e.g., a cluster of initiators may share the storage or multiple iSCSI host bus adapters on a single system). In the case of multiple initiators, some configuration information need be unique to the initiator and target pairing, and the configuration information may include secrets and authentication data. Thus, when only a single initiator is allowed to access a target, the configuration information may be stored with the target. By contrast, when multiple initiators are allowed to access a target, a small amount of configuration need be replicated for each initiator paired with the target.

This may allow most iSCSI configuration to be applied to the target entity. This may also provide an association between the iSCSI layer and the IPsec security policy, which may in effect allow the iSCSI layer to make decisions about access based on the security level. Thus, in accordance with an example of the present invention, shorter CHAP secrets for authentication may be allowed if the session is opened on a target that is already protected by an acceptable IPsec security policy.

The iSCSI initiator port and target port form the endpoints of an iSCSI session. An iSCSI session may contain multiple connections. Each connection has a specific security level (clear text, authentication headers, encryption, or the like) for all traffic on that connection. The iSCSI standard maps the iSCSI session to the SCSI I_T_Nexus, and requires that the initiator see the same SCSI resources across all connections in a session. This implies that all connections in a session need be at the same security level. Implicitly all connections in the session are from the same initiator.

Thus, the iSCSI target may be defined in terms of access of the iSCSI initiator to volumes on an iSCSI storage array. The following two volume access scopes may be defined:

Mapping—The subset of volumes mapped to initiator Logical Units; and

Security—The subset of volumes that can be accessed based on the IPsec security level of connections in a session.

In accordance with the present invention, the intersection of volume subsets from the mapping and security scopes defines a fully qualified subset of volumes on a network entity that can be accessed by an initiator via a single session.

FIG. 1 is a flow chart illustrating an exemplary method or process 100 for defining iSCSI targets using volume access and security policy in accordance with an exemplary embodiment of the present invention. A unique mapping is created for one or more volumes of a network entity to be accessed by an initiator 102. The initiator's volume mapping subset is divided based on the security level at which the initiator accesses the volumes 104.

The mapping subset and a security subset inside the mapping subset may then be used to define a target that the initiator may open a session with 106. The initiator accesses the volume via connections that have a specific security level which becomes the security level of the session. The security subset is part of the mapping subset having a specific security level. The security subset of all volumes may include volumes accessed by multiple initiators. The intersection of these two subsets defines the fully qualified subset which constitutes the fully qualified target. An alternative method for defining the fully qualified subset targets is to divide all volumes into subsets based on how each initiator gets access to the volume and then to assign unique mappings to each volume. This method creates the security subsets first and then the initiator access subsets. Preferably, if the initiator accesses all its volumes via a certain security level, the combination of the mapping subset for the initiator and that specific security level may be used to define a fully qualified target that the initiator may open session with. Alternatively, if the initiator accesses some of its volumes via a first security level and some other volumes via a different second security level, then the combination of the mapping subset for the initiator and the first security level may be used to define a first fully qualified target that the initiator may open session with, and the combination of the mapping subset for the initiator and the second security level may be used to define a second fully qualified target that the initiator may open session with.

Figure 2:
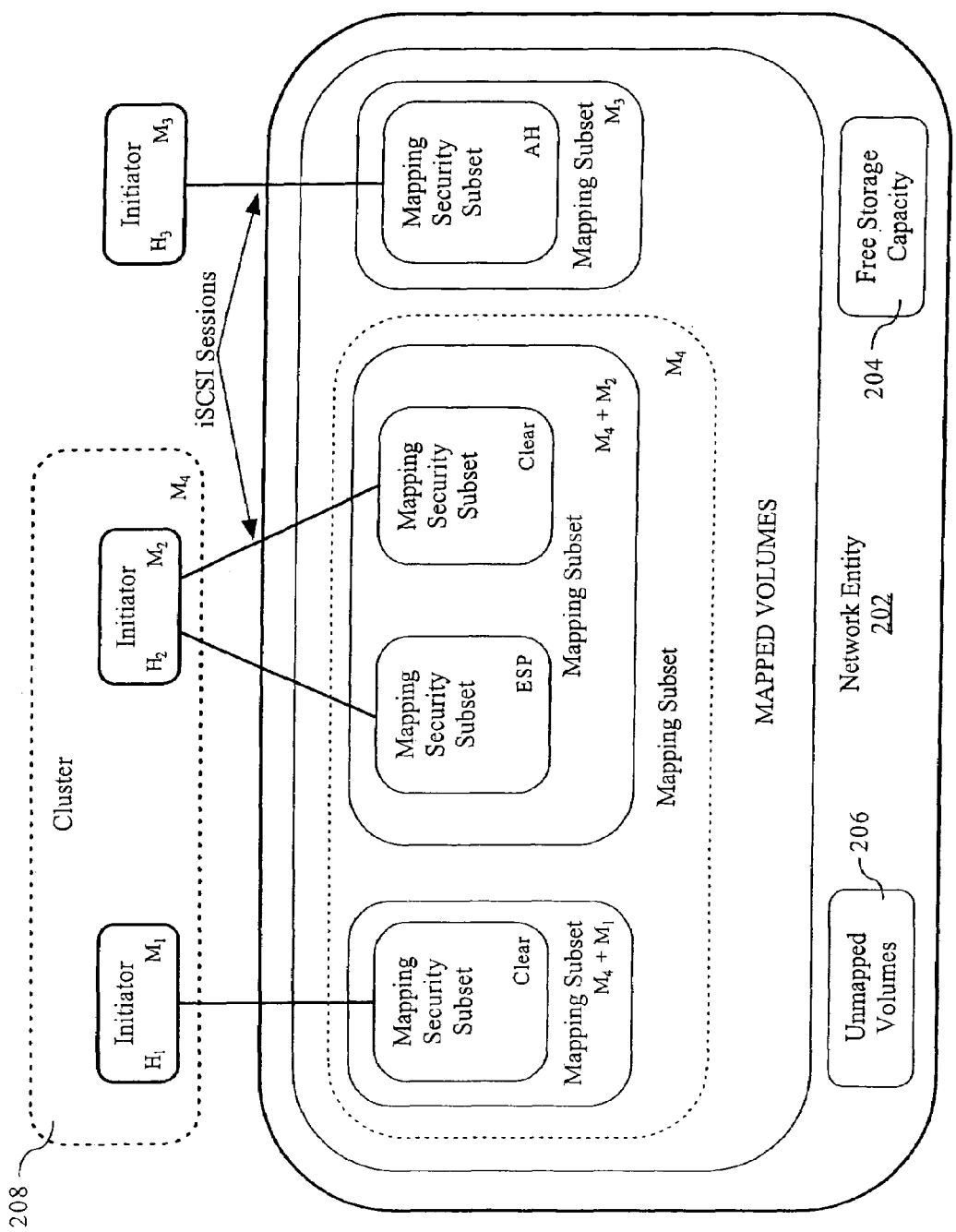
FIG. 2 shows exemplary subsets of volumes on a network entity by security level and access control list in accordance with an exemplary embodiment of the present invention.

Referring now to FIG. 2, exemplary subsets of volumes on a network entity 202 by security level and access control list in accordance with an exemplary embodiment of the present invention are shown. The method 100 shown in FIG. 1 may be implemented in the network entity 202 to define iSCSI targets using volume access and security policy. The network entity 202 may include free storage capacity 204 that can be organized into volumes to be exported by the SCSI devices of the network entity 202. The network entity 202 may also include some volumes 206 that have not been mapped to any initiator. When a volume of the network entity 202 is mapped to an initiator, the volume may be made available by a SCSI device on the network entity 202 with a unique Logical Unit Number (LUN) for that initiator. A single iSCSI target device may encapsulate each SCSI device on the network entity that accesses a volume subset.

As shown in FIG. 2, there are three iSCSI initiators ($H_1$, $H_2$, and $H_3$) accessing the network entity 202. Any unique name may be used to identify the mapping subset of volumes that can be accessed by that initiator. For example, the mapping subset $M_3$ identifies the access control subset associated with the initiator $H_3$. Two of the iSCSI initiators ($H_1$ and $H_2$) are part of a multiple system cluster 208. The cluster 208 may be an operating system defined cluster, multiple iSCSI HBAs (host bus adapters) in a single system, multiple systems with an application that shares storage devices, or the like. The cluster 208 may have an additional mapping for volumes that are shared by the initiators in the cluster 208. As shown, the mapping subset $M_4$ is accessed by both initiators $H_1$ and $H_2$ in the cluster 208. Since each initiator in a cluster has both its own mapping and the cluster mapping, the mapping subset for an initiator in the cluster is the union of the initiator and cluster mapping subsets. Thus, the mapping subset for initiator $H_1$ is the union of the $M_1$ and $M_4$ mapping subsets ($M_1+M_4$). Likewise, the mapping subset for initiator $H_2$ is the union of the $M_2$ and $M_4$ mapping subsets ($M_2+M_4$).

Each initiator accesses the volumes via connections that have a specific security level which becomes the security level of the session. For example, as shown in FIG. 2, initiator $H_3$ may access all its volumes via a security level (AH) using IPsec authentication headers; initiator $H_1$ may access all its volumes via a security level (Clear) using clear text; and initiator $H_2$ may access some of its volumes via a security level (ESP) using IPsec encryption and others via a security level (Clear) using clear text. Thus, the mapping subset of initiator $H_2$ is further subset by the connection and session security level.

FIG. 2 shows the four iSCSI targets that are fully qualified by the mapping and security subsets. They are defined by the mapping and security subsets. Initiator $H_1$ may open sessions with a fully qualified target $M_4+M_1$^Clear. Initiator $H_2$ may opens session with fully qualified targets $M_4+M_2$^ESP and $M_4+M_2$^Clear. Initiator $H_3$ may open sessions with a fully qualified target $M_3$^AH. Thus, the operational parameters, authentication, and security levels may all be associated with the fully qualified iSCSI target, thus simplifying iSCSI configuration.

Defining separate targets for the fully qualified volume mapping and security level subset may have the following advantages: (1) all iSCSI operational parameters can be uniquely defined for each initiator/target pair and associated with the fully qualified target; (2) authentication settings can be uniquely defined for each initiator/target pair and associated with the fully qualified target; (3) sessions may be formed between specific initiator/target pairs identified by the fully qualified target; (4) each fully qualified target cannot be accessed by any other initiator; (5) the security level may be identified by the fully qualified target so that the iSCSI layer implicitly knows what security policy has been used for all connections in any session open on the target; (6) each initiator may have a unique set of iSCSI targets on the network entity which it can address by name; and (7) the exact set of volumes accessed by an initiator at a given security level may be identified by the iSCSI target alone.

If iSCSI targets are defined for just security levels, all the foregoing-described advantages except (4) may be lost. If iSCSI targets are defined for just volume mapping, all the foregoing-described advantages except (1) may be lost. When the iSCSI target is not associated with the fully qualified volume subset on the network entity, some of the configuration parameters may become common for all initiators that access a target, requiring that either a least common denominator approach is used for configuration or requiring that the configuration for a session be spread across initiators and targets instead of being associated directly with the target.

The present volume subset concept may also be used to define a convention for automatically generating iSCSI target names. The iSCSI name provides a world wide unique identifier for an iSCSI initiator node or iSCSI target node. The iSCSI name identifies the iSCSI target and iSCSI initiator during login negotiation and identifies the SCSI device encapsulated by an iSCSI target. The lifetime of an iSCSI target or iSCSI initiator is defined as the time period for which the iSCSI name exists.

The iSCSI standard supports the use of multiple naming authorities to generate iSCSI names. It is the responsibility of the naming authority to ensure that iSCSI names for all devices are unique. The iSCSI standard allows considerable flexibility in mapping one or more iSCSI targets to the SCSI devices of an iSCSI device. The standard prefers that only a single iSCSI initiator be defined for an iSCSI device. Thus, an iSCSI device such as a storage array and the like may contain multiple iSCSI target nodes and a single iSCSI initiator node.

Figure 3:
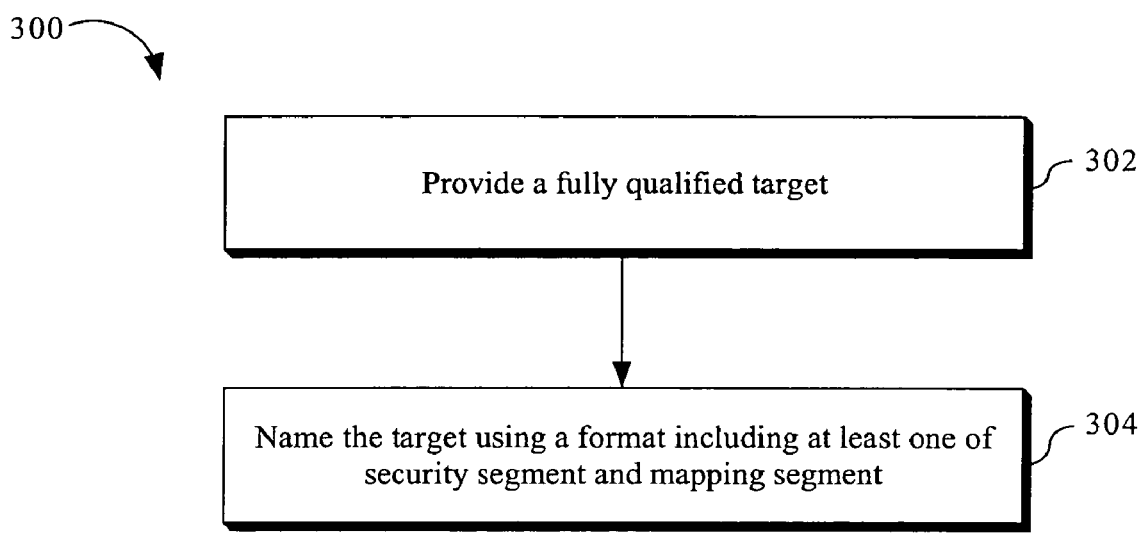
FIG. 3 is a flow chart illustrating an exemplary method for naming a fully qualified iSCSI target based on the volume mapping and security level subsets on the network entity in accordance with an exemplary embodiment of the present invention.

According to the present invention, the name for each fully qualified target may be uniquely defined based on the volume mapping and security level subsets on the network entity. FIG. 3 is a flow chart illustrating an exemplary method 300 for naming a fully qualified iSCSI target based on the volume mapping and security level subsets on the network entity in accordance with an exemplary embodiment of the present invention. A fully qualified target is provided 302. A fully qualified target is the intersection of a volume mapping subset and a security level subset of all volumes on the iSCSI network entity. The fully qualified target may be provided according to the method 100 shown in FIG. 1. It is understood that other methods may be used to generate fully qualified targets without departing from the scope and spirit of the present invention (e.g., defining the target, generating unique LUN mappings for all volumes in the target, assigning a single security level to the target, and then specifying one or more initiators that can access the target). The target may then be named using a format including at least one of a security segment and a mapping segment 304. If the IQN (iSCSI Qualified Name) name format is used, the security segment may include the ID of the IPsec security policy of the connections in a session that may access the target, and the mapping segment may include the ID of the storage mapping of the volumes that can be accessed by an initiator. It is understood that the method 300 shown in FIG. 3 may also be used to define an iSCSI target in the EUI and NAA (Network Address Authority) name formats. For each of these formats, each volume mapping and/or security level subset may be assigned a unique EUI-64 name. This may require more than one EUI-64 value per network entity and may lack the readability of the names generated for the IQN iSCSI name format.

In a preferred embodiment, both the security segment and the mapping segment are included in the target name. Alternatively, the name used for iSCSI targets may also be defined using just volume mapping or security level. If only security level subsets are being used for iSCSI target names, the mapping segment of the name may be omitted. Likewise, if only volume mapping subsets are being used for iSCSI target names, the security segment of the name may be omitted. Preferably, to ensure that the target name is unique, some base name such as an EUI-64 identifier may be included in the target name.

Figure 4:
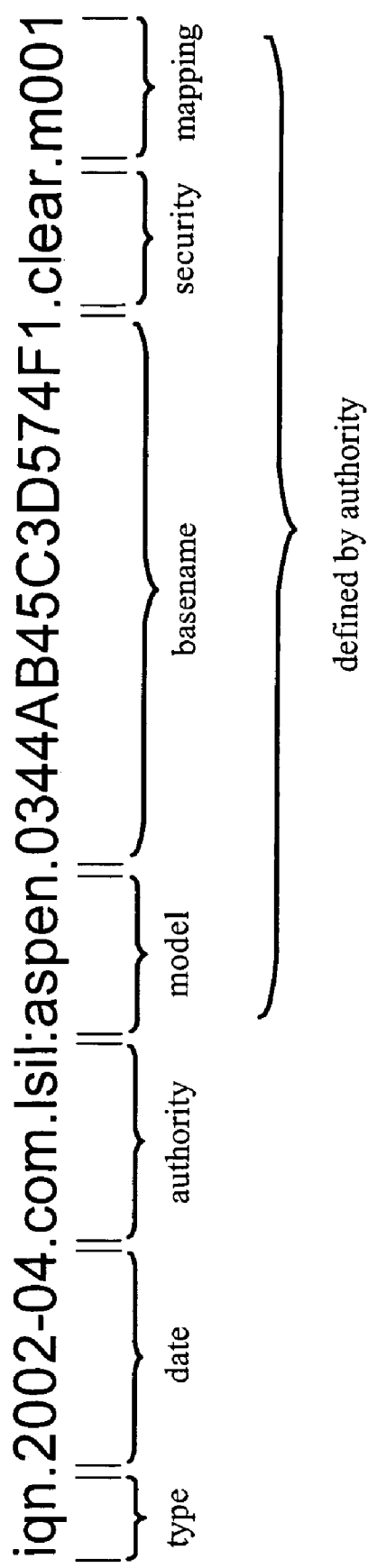
FIG. 4 shows an exemplary name that fully qualifies the volume mapping and security level subsets of a target in accordance with an exemplary embodiment of the present invention.

FIG. 4 shows an exemplary name 400 that fully qualifies the volume mapping and security level subsets of a target in accordance with an exemplary embodiment of the present invention. The name 400 may be obtained as a result of implementing the method 300 shown in FIG. 3. As shown, the name 400 uses the IQN (iSCSI Qualified Name) name format, where the following segments are included:

type—the iSCSI Qualified Name (IQN) naming authority indicator: "iqn";

date—the date at which the naming authority owned the domain name;

authority—the domain name of the naming authority in reverse order;

model—the network entity model name;

basename—the world wide unique EUI-64 base name for the network entity;

security—the ID of the IPsec security policy of the connections in a session that may access the target; and mapping—the ID of the storage mapping of the volumes that can be accessed by an initiator.

Using the present naming convention based on volume mapping and security levels subsets may have the following additional advantage: the iSCSI target name may not need to be stored but may be generated from the mapping and security level identifiers when the system including the target is booted as long as the mapping and security level identifiers are persistent.

It should be noted that the use of the present naming convention is not required to associate iSCSI targets with the volume mapping and security level subsets. User defined target names may be applied to the fully qualified iSCSI targets without sacrificing any of the advantages provided by being associated with fully qualified iSCSI targets.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for defining an iSCSI target using volume access and security policy, comprising steps of:
    (a) uniquely mapping at least one volume of a network entity to an iSCSI initiator to create a mapping subset, wherein the mapping defines the Logical Unit Number for the at least one volume to the iSCSI initiator;
    (b) defining at least one security level used by said iSCSI initiator to access each of said at least one volume in order to define a security subset, wherein said defining said at least one security level utilizes security access policies including at least an initiator access control list and an IPsec (Internet Protocol security) security policy; and
    (c) taking intersection of the mapping subset and the security subset to define and name a fully qualified iSCSI target in terms of access of said iSCSI initiator to each of said at least one volume, based on the intersection of the mapping subset and the security subset, wherein a session between the at least one volume and the iSCSI initiator is capable of being uniquely specified utilizing the name of the fully qualified iSCSI target and wherein defining an iSCSI target is a process of assigning an address to an iSCSI device enabling the iSCSI device to be utilized, with which said iSCSI initiator may open a session.

2. The method of claim 1, wherein said step (b) comprising:
    when said initiator is part of a multiple system cluster, identifying said mapping subset by a union of an initiator mapping subset and a cluster mapping subset.

3. The method of claim 1, wherein said step (c) comprising:
    when said initiator accesses one of said at least one volume via a security level, defining said target with a combination of said mapping subset and said security level.

4. The method of claim 1, wherein said step (c) comprising:
    when said initiator accesses a first part of one of said at least one volume via a first security level and a second part of said one of said at least one volume via a second security level, defining a first target with a combination of said mapping subset and said first security level, and defining a second target with a combination of said mapping subset and said second security level.

5. A computer-readable medium having computer-executable instructions for performing a method for defining an iSCSI target using volume access and security policy, said method comprising steps of:
    (a) uniquely mapping at least one volume of a network entity to an iSCSI initiator to create a mapping subset, wherein the mapping defines the Logical Unit Number for the at least one volume to the iSCSI initiator;
    (b) defining at least one security level used by said iSCSI initiator to access each of said at least one volume in order to define a security subset, wherein said defining said at least one security level utilizes security access policies including at least an initiator access control list and an IPsec (Internet Protocol security) security policy; and
    (c) taking intersection of the mapping subset and the security subset to define and name a fully qualified iSCSI target in terms of access of said iSCSI initiator to each of said at least one volume, based on the intersection of the mapping subset and the security subset, wherein a session between the at least one volume and the iSCSI initiator is capable of being uniquely specified utilizing the name of the fully qualified iSCSI target and wherein defining an iSCSI target is a process of assigning an address to an iSCSI device enabling the iSCSI device to be utilized, with which said iSCSI initiator may open a session.

6. The computer-readable medium of claim 5, wherein said step (b) comprising:
    when said initiator is part of a multiple system cluster, identifying said mapping subset by a union of an initiator mapping subset and a cluster mapping subset.

7. The computer-readable medium of claim 5, wherein said step (c) comprising:

when said initiator accesses one of said at least one volume via a security level, defining said target with a combination of said mapping subset and said security level.

8. The computer-readable medium of claim 5, wherein said step (c) comprising:
when said initiator accesses a first part of one of said at least one volume via a first security level and a second part of said one of said at least one volume via a second security level, defining a first target with a combination of said mapping subset and said first security level, and defining a second target with a combination of said mapping subset and said second security level.

9. A method for naming a fully qualified iSCSI target based on volume mapping and security level subsets on a network entity, comprising steps of:
(a) providing a fully qualified iSCSI target, comprising:
uniquely mapping at least one volume of a network entity to an iSCSI initiator to create a mapping subset, wherein the mapping defines the Logical Unit Number for the at least one volume to the iSCSI initiator;
defining at least one security level used by said iSCSI initiator to access each of said at least one volume in order to define a security subset, wherein said defining said at least one security level utilizes security access policies including at least an initiator access control list and an IPsec (Internet Protocol security) security policy; and
taking intersection of the mapping subset and the security subset to define and name said fully qualified iSCSI target in terms of access of said iSCSI initiator to each of said at least one volume, based on the intersection of the mapping subset and the security subset, wherein a session between the at least one volume and the iSCSI initiator is capable of being uniquely specified utilizing the name of the fully qualified iSCSI target and wherein defining an iSCSI target is a process of assigning an address to an iSCSI device enabling the iSCSI device to be utilized, with which said initiator may open a session; and
(b) naming said fully qualified iSCSI target using a format including at least one of a security segment and a mapping segment.

10. The method of claim 9, wherein said format uses an IQN name format, said security segment includes an ID of an IPsec security policy of connections in a session that may access said fully qualified target, and said mapping segment includes an ID of a storage mapping of volumes that may be accessed by an initiator.

11. The method of claim 9, wherein said format uses one of EUI and NAA name formats, said security segment includes a first EUI-64 value, and said mapping segment includes a second EUI-64 value.

12. The method of claim 9, wherein said format includes both said security segment and said mapping segment.

13. The method of claim 9, wherein said format includes an EUI-64 identifier as a base name.

14. The method of claim 9, wherein said step (b) is performed when a system including said fully qualified target is booted.

15. A computer-readable medium having computer-executable instructions for performing a method for naming a fully qualified iSCSI target based on volume mapping and security level subsets on a network entity, said method comprising steps of:
(a) providing a fully qualified iSCSI target, comprising:
uniquely mapping at least one volume of a network entity to an iSCSI initiator to create a mapping subset, wherein the mapping defines the Logical Unit Number for the at least one volume to the iSCSI initiator;
defining at least one security level used by said iSCSI initiator to access each of said at least one volume in order to define a security subset, wherein said defining said at least one security level utilizes security access policies including at least an initiator access control list and an IPsec (Internet Protocol security) security policy; and
taking intersection of the mapping subset and the security subset to define and name said fully qualified iSCSI target in terms of access of said iSCSI initiator to each of said at least one volume, based on the intersection of the mapping subset and the security subset, wherein a session between the at least one volume and the iSCSI initiator is capable of being uniquely specified utilizing the name of the fully qualified iSCSI target and wherein defining an iSCSI target is a process of assigning an address to an iSCSI device enabling the iSCSI device to be utilized, with which said initiator may open a session; and
(b) naming said fully qualified iSCSI target using a format including at least one of a security segment and a mapping segment.

16. The computer-readable medium of claim 15, wherein said format uses an IQN name format, said security segment includes an ID of an IPsec security policy of connections in a session that may access said fully qualified target, and said mapping segment includes an ID of a storage mapping of volumes that may be accessed by an initiator.

17. The computer-readable medium of claim 15, wherein said format uses one of EUI and NAA name formats, said security segment includes a first EUI-64 value, and said mapping segment includes a second EUI-64 value.

18. The computer-readable medium of claim 15, wherein said format includes both said security segment and said mapping segment.

19. The computer-readable medium of claim 15, wherein said format includes an EUI-64 identifier as a base name.

20. The computer-readable medium of claim 15, wherein said step (b) is performed when a system including said fully qualified target is booted.

* * * * *